United States Patent [19]

Schonlau

[11] Patent Number: 5,022,715
[45] Date of Patent: Jun. 11, 1991

[54] PRESSURE CONTROL DEVICE FOR BRAKE SYSTEMS OF AUTOMOTIVE VEHICLES

[75] Inventor: Juergen Schonlau, Walluf, Fed. Rep. of Germany

[73] Assignee: Alfred Teves GmbH, Frankfurt am Main, Fed. Rep. of Germany

[21] Appl. No.: 463,055

[22] Filed: Jan. 10, 1990

[30] Foreign Application Priority Data

Jan. 31, 1989 [DE] Fed. Rep. of Germany ....... 3902789

[51] Int. Cl.$^5$ .............................................. B60T 8/26
[52] U.S. Cl. ................................. 303/9.68; 188/349; 303/9.75; 303/24.1
[58] Field of Search ................. 303/9.68, 9.69, 9.73, 303/9.75, 22.7, 24.1; 188/349

[56] References Cited

U.S. PATENT DOCUMENTS

| | | | |
|---|---|---|---|
| 3,476,443 | 11/1969 | Bratten et al. | 303/9.68 |
| 4,239,296 | 12/1980 | Kaub | 303/9.68 |
| 4,390,213 | 6/1983 | Berisch | 303/9.68 |
| 4,840,433 | 6/1989 | Schonlau et al. | 303/9.68 |

Primary Examiner—Douglas C. Butler
Attorney, Agent, or Firm—Robert P. Seitter; J. Gordon Lewis

[57] ABSTRACT

A pressure control device for brake systems of automotive vehicles. The device includes a stepped control piston (5) which is guided axially displaceably within a housing (1, 2) and which, cooperating with a valve element (14), controls the pressure medium passage between an inlet chamber (8) and an outlet chamber (9). The smaller diameter portion (6) of the control piston (5) is associated with the inlet chamber (8) containing the valve element (14). In order to optimally adapt the control characteristic to the specific requirements of the vehicles it is provided that the valve element (14) is applied by a displaceable stop (17).

17 Claims, 1 Drawing Sheet

PRESSURE CONTROL DEVICE FOR BRAKE SYSTEMS OF AUTOMOTIVE VEHICLES

BACKGROUND OF THE INVENTION

The present invention relates to a pressure control device for brake systems of automotive vehicles including a stepped control piston which cooperates with a valve element to control pressure medium passage between an inlet and an outlet chamber.

Such a pressure control device is known from the Published German Patent Application DE-OS No. 32 43 053 where the valve element is designed as an inertia element which upon a certain deceleration being reached, abuts on a valve seat provided on the control piston. As soon as this operating position has been reached, the control piston functions as a hydraulic transmission piston so that the outlet pressure is reduced with respect to the inlet pressure by the ratio of the cross-sectional surfaces of the stepped piston.

The disadvantage of a control device of this type is the change-over pressure dependence on the viscosity and on the flow rate, and the fact that the reduction ratio will be constant after the deceleration-responsive change-over pressure has been reached. As a consequence, it is impossible to adapt the rear axle braking pressures optimally to the specific requirements of the vehicle.

It is, therefore, an object of this invention to provide a pressure control device of this type which, in addition to a simple construction, is characterized by a reliable operation which is independent of temperatures and flow rates. Moreover, an optimum adaption of the characteristic line to the specific requirements of the vehicle is provided.

SUMMARY OF THE INVENTION

This object is achieved in accordance with the teachings of the present invention. By means of the inventive solution it is possible to influence the mode of operation of the control piston so that, as a function of the operating position of the displaceable stop, it will act as a control piston in the one instance and as a transmission piston in the other instance.

The actuation of the displaceable stop may occur as a function of various control variables. Suitable control variables in particular are the vehicle deceleration in the longitudinal and/or transverse directions as well as the vehicle load. For example, the relative motion between a sprung guide part and an unsprung guide part may serve as a load-responsive control variable.

A particularly cost-saving embodiment of the present invention provides that the application of the valve element is controlled by the operating position of an inertia element. An especially compact pressure control unit is provided wherein the displaceable stop is designed as a tappet extending with radial play through a longitudinal bore of the control piston and extends out of the outlet chamber in a sealed manner.

In order to adapt the control characteristic optimally it is of particular advantage if the displaceable stop and/or the control piston are prestressed by elastic means. In order to exclude any influencing action on the inertia element by influences of the flow rate or viscosity it is advantageous to provide the inertia element in a chamber through which no pressure medium flows. A particularly simple support of the inertia element is achieved if it is tiltably supported on the bottom of the chamber by means of an acute-angled abutment. Such a support on a needle point permits a control motion of the inertia element both in the longitudinal and transverse directions.

If a deceleration-responsive control motion of the inertia element in one direction is sufficient, a preferred embodiment provides that the contact surface of the abutment has a linear design in the form of a knife edge.

The susceptibility of the inertia element to excursion and shocks can be influenced by means of a damping fluid and/or elastic means.

BRIEF DESCRIPTION OF THE DRAWINGS

Further advantages and the operation of this invention will become evident from the following detailed description of a preferred embodiment, reference being made to the accompanying drawing wherein.

DETAILED DESCRIPTION

Figure 1:
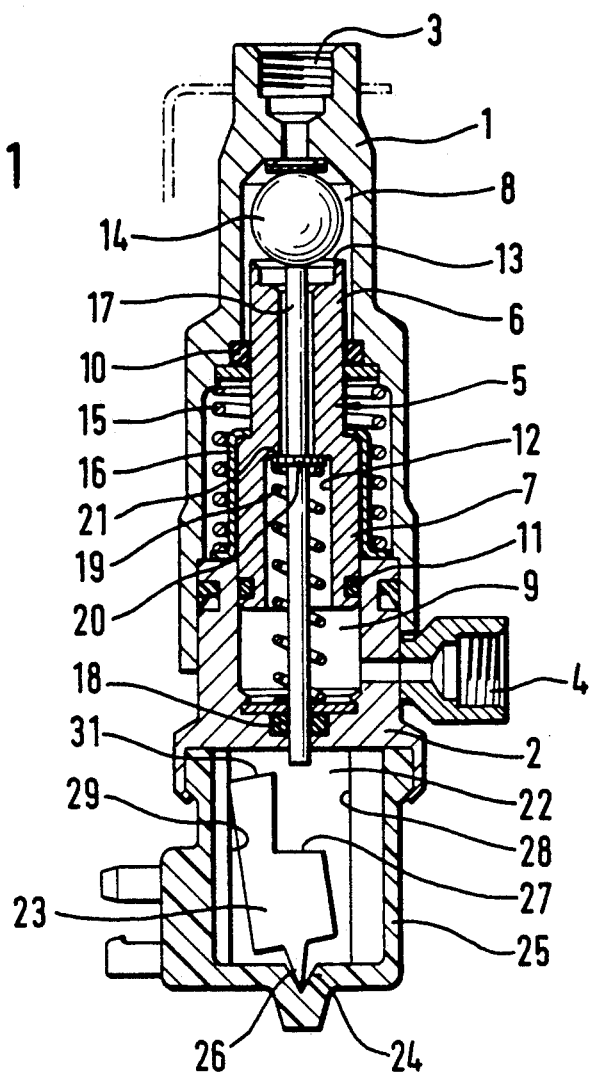
FIG. 1 is a longitudinal section through a pressure control device in accordance with the present invention; and, FIG. 2 is a control characteristic curve useful in explaining the operation of the control device of the present invention.

The pressure control device represented in FIG. 1 includes a housing composed of two housing parts 1 and 2 and provided with an inlet port 3 and an outlet port 4. In the housing, a stepped control piston 5 is arranged whose smaller diameter portion 6 projects into the inlet chamber 8 and whose larger diameter portion 7 is associated with the outlet chamber 9. The piston 5 is sealed with respect to the housing by means of a seal 10 positively fastened in the housing part 1 and by means of a seal 11 arranged in an annular groove provided in portion 7. The control piston 5 is provided with a stepped central through bore 12 whose end facing the inlet chamber 8 is designed as a valve seat 13. The valve closure member 14 provided in the inlet chamber 8 is associated with the valve seat 13 in terms of operation. By means of the control spring 15, the control piston 5 is acted upon by an elastic force which prestresses the piston in the direction of the outlet chamber 9. For the purpose of transmission of this control force the control piston 5 is encompassed by a bowl-type spring retainer 16 whose flange-shaped expansion is acted upon by the one end of the control spring 15 while the other end supports itself on a shoulder of the housing.

The tappet 17 extends with radial play through the central through bore 12 of the control piston 5. When the pressure control device is not being actuated, the end of tappet 17 facing the inlet chamber 8 is abutted by the valve closure member 14. Sealed by the gasket 18, the opposite end of tappet 17 extends out of the housing part 2. The tappet 17 is prestressed by means of the compression spring 19 in the direction of the inlet chamber 8. To this end, the tappet 17 has radially extending stops 20 distributed along the circumference. Between stops 20 there always remains a flow passage for the pressure medium to flow through the through bore 12. The stops serve for the support of the compression spring 19 whose other end supports itself on the bottom of the outlet chamber 9.

The end of the tappet 17 led out of the outlet chamber 9 projects into chamber 22 wherein the inertia element 23 is arranged. The inertia element 23 is supported in a wedge-shaped groove 24 of the housing 25 which is fastened with the housing part 2 by means of caulking. The groove 24 is arranged in the extension of the axis of the tappet 17. For the purpose of support the inertia element 23 has an acute-angled knife-edge-shaped supporting edge 26.

The inertia element 23 has an essentially L-shaped cross section with a step 27. As seen in the driving direction of the vehicle, step 27 is constructed on the front side. The position of the center of gravity of the inertia element 23, in conjunction with the limiting surfaces 28 and 29, ensures that, without any action of decelerating forces, the inertia element 23 will be in the illustrated position. That is, that it will abut on the rear limiting surface 29 as seen in the direction of driving.

Figure 2:
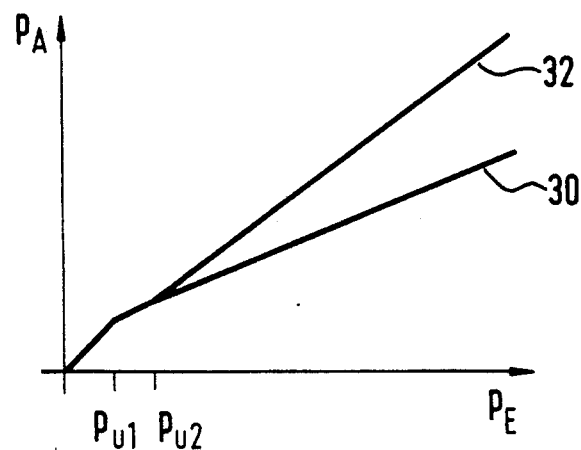

When not actuated, the pressure control device will be in the position represented in FIG. 1. If pressure medium is supplied through the master cylinder (not shown) for the purpose of a pressure build-up the pressure medium at first will flow from the inlet chamber 8 into the outlet chamber by way of the central through bore 12 and from the outlet chamber into the non-represented rear wheel brakes by way of the outlet port 4. In the initial phase of the pressure build-up the tappet 17 will keep the valve closure member 14 at a distance with regard to the valve seat 13. Because of the different-sized pressure-applicable annular surfaces of the control piston 5, the latter will displace in opposition to the force of the control spring 15 towards the valve closure member 14. When the change-over pressure marked $P_u$ in FIG. 2 has been reached the valve seat 13 will come to abut the valve closure member 14 for the first time. Upon a further increase of the inlet pressure $P_E$ the outlet pressure $P_A$ will be reduced in respect of the inlet pressure $P_E$ in the known manner by the ratio of the pressure-applicable annular surfaces. The reduction factor corresponds to the gradient of the straight line 30 of the characteristic line represented in FIG. 2.

As the tappet 17 is always applied by the outlet pressure $P_A$ it will displace itself as a function of the pressure, in opposition to the force of the compression spring 19, towards the inertia element 23. The displacement will start shortly before the change-over pressure $P_{U2}$ has been reached, with the control piston 5 at first following this motion. If at this time the attained deceleration of the vehicle is sufficient to displace the inertia element 23 in the direction of driving so as to have it abut on the limiting surface 28, the tappet 17 will come to abut on the upper limiting surface 31 of the inertia element 23 upon reaching of pressure $P_{U2}$ and the outlet pressure $P_A$ will be reduced with respect to the inlet pressure $P_E$ in correspondence with the straight line 30. Such a high deceleration with corresponding braking pressures will be reached in the case of a vehicle load lying between that of an unloaded and that of a partially loaded vehicle.

With the vehicle load exceeding the partially loaded condition, the inertia element 23 remains abutted on the limiting surface 29 because of insufficient vehicle deceleration so that the tappet 17 can displace until it abuts on the step 27 of the inertia element 23. In this case the tappet 17 no longer applies the valve closure member 14 so that the latter will remain abutted on the valve seat 13. Upon a further increase of the inlet pressure, the control piston 5 then will displace with the closed valve 13, 14 in the direction of the outlet chamber 9 and will act as a transmission piston which will reduce the outlet pressure $P_A$ with respect to the inlet pressure $P_E$ by the ratio of the cross-sectional surface of portion 6 to the cross-sectional surface of portion 7. The reduction ratio will correspond to the gradient of the straight line 32 illustrated in FIG. 2. As the gradient of straight line 32 is greater than that of straight line 30, the effective rear axle braking pressures will be higher in the case of a higher vehicle load. By means of the deceleration-responsive and load-responsive characteristic line of the pressure control unit the rear axle braking forces are utilized optimally. At the same time, the rating of the braking pressure control unit ensures that the rear wheels will be prevented from locking.

What is claimed is:

1. A pressure control device for brake system of automotive vehicles with a stepped control piston which is guided axially displaceably within a housing and which, cooperating with a valve element, controls the pressure medium passage between an inlet chamber and an outlet chamber, with a smaller diameter portion of the control piston being coupled with the inlet chamber containing the valve element, wherein in the valve element (14) is applied by a displaceable stop (17) including a spring which prestresses said stop (17) in the direction of said valve element (14).

2. A pressure control device as claimed in claim 1, wherein the application of the valve element (14) occurs as a function of vehicle deceleration.

3. A pressure control device as claimed in claim 2, wherein the application of the valve element (14) is controlled by the operating position of an inertia element (23).

4. A pressure control device as claimed in claim 1, wherein the application of the valve element (14) occurs as a function of the vehicle load.

5. A pressure control device as claimed in claim 1, wherein the control piston (5) is prestressed by a control spring (15) in the direction of its larger diameter portion (7).

6. A pressure control device as claimed in claim 1, wherein the displaceable stop (17) is operated by mechanical means as a function of the vehicle load.

7. A pressure control device as claimed in claim 1, wherein the displaceable stop (17) is operated by hydraulic means as a function of the vehicle load.

8. A pressure control device for brake systems of automotive vehicles with a stepped control piston which is guided axially displaceably within a housing and which, cooperating with a valve element, controls the pressure medium passage between an inlet chamber and an outlet chamber, with a smaller diameter portion of the control piston being coupled with the inlet chamber containing the valve element, wherein in the valve element (14) is applied by a displaceable stop (17), wherein the application of the valve element (14) occurs as a function of vehicle deceleration, wherein the application of the valve element (14) is controlled by the operating position of an inertia element (23), and wherein that the displaceable stop is designed as a tappet (17) extending with radial play through a longitudinal bore of the control piston.

9. A pressure control device as claimed in claim 8, wherein the tappet (17) is sealed within the outlet chamber (9).

10. A pressure control device for brake systems of automotive vehicles with a stepped control piston which is guided axially displaceable within a housing and which, cooperating with a valve element, controls the pressure medium passage between an inlet chamber and an outlet chamber, with a smaller diameter portion of the control piston being coupled with the inlet chamber containing the valve element, wherein in the valve element (14) is applied by a displaceable stop (17), and wherein the displaceable stop (17) is prestressed by elastic means (19) in the direction of the valve element (14).

11. A pressure control for brake systems of automotive vehicles with a stepped control piston which is guided axially displaceably within a housing and which, cooperating with a valve element, controls the pressure medium passage between an inlet chamber and an outlet chamber, with a smaller diameter portion of the control piston being coupled with the inlet chamber containing the valve element, wherein in the valve element (14) is applied by a displaceable stop (17), wherein the application of the valve element (14) occurs as a function of vehicle deceleration, and wherein the inertia element (23) is provided in a chamber (22) through which no pressure medium flows.

12. A pressure control device as claimed in claim 11, wherein the inertia element (23) is tiltably supported and has a control cam limiting the displacement of the tappet.

13. A pressure control device as claimed in claim 12, wherein the inertia element (23) is tiltably supported by means of an acute-angled abutment (24, 26).

14. A pressure control device as claimed in claim 13, wherein the contact surface of the abutment (24, 26) is cooperatively formed with its adjacent structure.

15. A pressure control device as claimed in claim 13, wherein the contact surface of the abutment (24, 26) is linear.

16. A pressure control device as claimed in claim 13, wherein the chamber (22) wherein the inertia element (23) is provided is filled with a damping fluid.

17. A pressure control device as claimed in claim 13, wherein the inertia element is prestressed by elastic means.

* * * * *